United States Patent
Feng et al.

(10) Patent No.: US 8,095,502 B2
(45) Date of Patent: Jan. 10, 2012

(54) LIGHTWEIGHT DIRECTORY ACCESS PROTOCOL (LDAP) ADMINISTRATOR TASK NOTIFICATION CONTROL

(75) Inventors: Daw Feng, Austin, TX (US); Annemarie R. Fitterer, Austin, TX (US); Shevaun-Ann M. Fontenot, Georgetown, TX (US); Kristin M. Hazlewood, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 504 days.

(21) Appl. No.: 12/209,246

(22) Filed: Sep. 12, 2008

(65) Prior Publication Data
US 2010/0070545 A1   Mar. 18, 2010

(51) Int. Cl.
*G06F 17/30* (2006.01)
(52) U.S. Cl. ....................................................... 707/609
(58) Field of Classification Search .......... 707/2, 104.1, 707/609; 709/223; 715/738
See application file for complete search history.

(56) References Cited

U.S. PATENT DOCUMENTS

| | | | | |
|---|---|---|---|---|
| 6,141,692 | A * | 10/2000 | Loewenstein et al. | 709/234 |
| 7,469,382 | B1 * | 12/2008 | Dwight | 715/738 |
| 2007/0140460 | A1 * | 6/2007 | Cai et al. | 379/218.01 |
| 2008/0016123 | A1 | 1/2008 | Devraj et al. | |
| 2008/0046559 | A1 | 2/2008 | Langer et al. | |
| 2008/0208909 | A1 * | 8/2008 | Rowley | 707/104.1 |

* cited by examiner

*Primary Examiner* — Etienne Leroux
(74) *Attorney, Agent, or Firm* — Francis Lammes; Stephen J. Walder, Jr.; Jeffrey S. LaBaw

(57) ABSTRACT

The illustrative embodiments provide for automatically and proactively retrieving administrative maintenance tasks or potential issues from a set of directory servers without direct intervention from an administrator. Responsive to an operation request being sent from a requesting application to the set of directory servers and an administrative maintenance control mechanism being active, an administrative maintenance control is automatically sent to the set of directory servers. Responsive to receiving the response to the administrative maintenance control, an end user application within the data processing system is notified that the at least one of the administrative maintenance tasks or the potential issues have been received.

17 Claims, 5 Drawing Sheets

LIGHTWEIGHT DIRECTORY ACCESS PROTOCOL (LDAP) ADMINISTRATOR TASK NOTIFICATION CONTROL

BACKGROUND OF THE INVENTION

1. Field of the Invention

The present application relates generally to an improved data processing apparatus and method and more specifically to an apparatus and method for lightweight directory access protocol (LDAP) administrator task notification control.

2. Background of the Invention

A directory server provides a centralized directory service for intranet, network, and extranet information. Directory servers integrate with existing systems and act as a centralized repository for the consolidation of employee, customer, supplier, and partner information. Directory servers may be extended to manage user profiles and preferences, as well as extranet user authentication.

Usually, the front end of a directory server is a lightweight directory access protocol (LDAP). LDAP provides a common language that client applications and servers use to communicate with one another. LDAP is a "lightweight" version of the directory access protocol (DAP) used by the International Organization for Standardization (ISO) X.500 standard. DAP, developed at the University of Michigan, gives any application access to the directory via an extensible and robust information framework, but at an expensive administrative cost. DAP uses a communications layer (Open Systems Interconnection (OSI) stack) that is not the Internet standard Transmission Control Protocol/Internet Protocol (TCP/IP) protocol and has complicated directory-naming conventions. The current version of LDAP is 3 (LDAPv3), which is described by several Request for Comments (RFCs), RFCs —2251 through 2256 and others. There is currently a Lightweight Directory Access Protocol V3 Revision Working Group (LDAPbis) Internet Engineering Task Force (IETF) working group which is revising these old RFCs.

An LDAP directory server stores information in a tree-like hierarchical structure and may be characterized by very fast read operations, fairly static data, hierarchical in nature, use of a standard LDAP protocol, and loosely coupled replication. LDAP preserves the best features of DAP while reducing administrative costs. LDAP uses an open directory access protocol running over TCP/IP and uses simplified encoding methods. LDAP retains the X.500 standard data model and can support millions of entries for a modest investment in hardware and network infrastructure.

All servers require maintenance and, in maintaining a directory server, administrators must actively monitor the error log files of the directory server for maintenance related information. That is, an administrator must directly request the error log files from the directory server and perform maintenance whether the error log identifies administrative maintenance tasks or potential issues. Directly requesting administrative maintenance tasks or potential issues from a directory server is not the most effective approach to communicate maintenance information with administrators.

BRIEF SUMMARY OF THE INVENTION

In one illustrative embodiment, a method, in a data processing system, is provided for automatically and proactively retrieving administrative maintenance tasks or potential issues from a set of directory servers without direct intervention from an administrator. The illustrative embodiments automatically send an administrative maintenance control to the set of directory servers in response to an operation request being sent from a requesting application to the set of directory servers and the administrative maintenance control mechanism being active. The illustrative embodiments receive a response from the set of directory servers. In the illustrative embodiments the response includes a response to the operation request and a response to the administrative maintenance control. In the illustrative embodiments the response to administrative maintenance control comprises at least one of the administrative maintenance tasks or the potential issues. The illustrative embodiments notify an end user application within the data processing system that the at least one of the administrative maintenance tasks or the potential issues have been received in response to receiving the response to the administrative maintenance control.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE INVENTION

Figure 1:
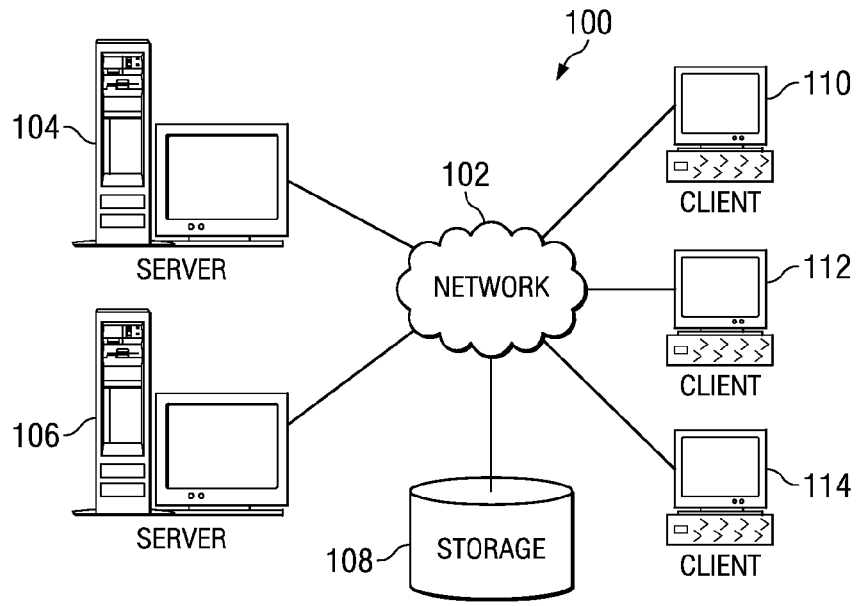
FIG. 1 depicts a pictorial representation of an example distributed data processing system in which aspects of the illustrative embodiments may be implemented.

The illustrative embodiments provide a mechanism for a lightweight directory access protocol (LDAP) administrator task notification control that provides administrators with notification via the LDAP protocol about potential problems and required administrative tasks. Examples of maintenance tasks include DB2® password updates, performance tuning of the database, resource monitoring, or the like.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
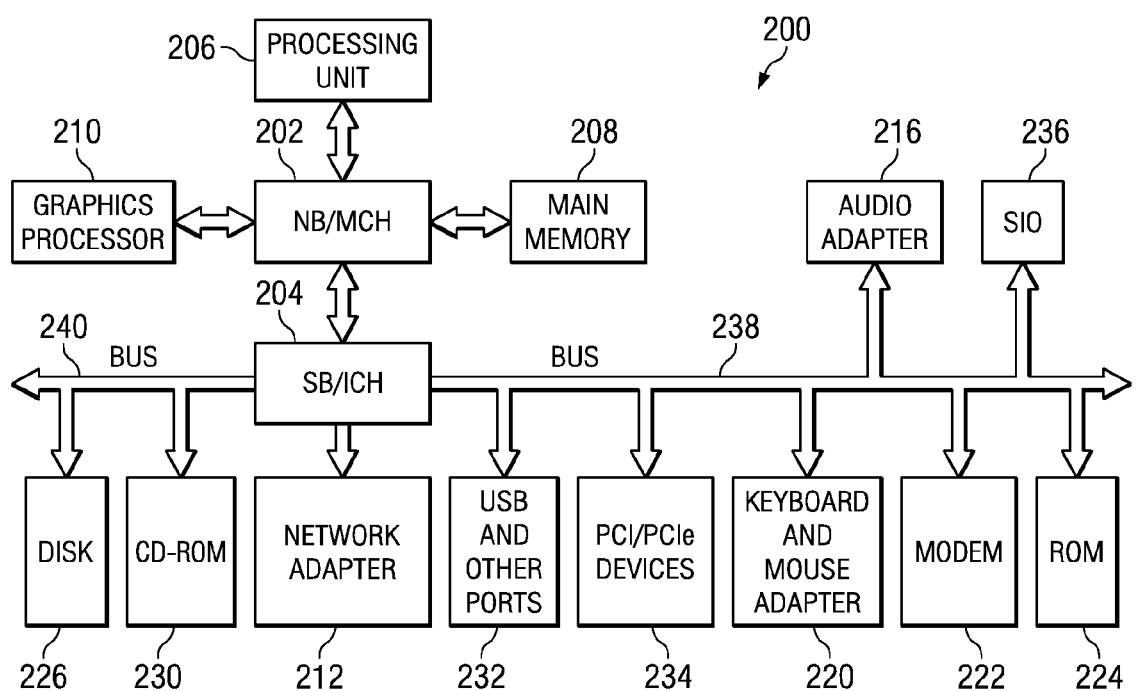
FIG. 2 shows a block diagram of an example data processing system in which aspects of the illustrative embodiments may be implemented.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a single data processing device implementation of a lightweight directory access protocol (LDAP) administrator task notification mechanism, this is only an example and is not intended to state or imply any limitation with regard to the features of the present invention. To the contrary, the illustrative embodiments are intended to include distributed data processing environments and embodiments in which administrators are provided with notification via a LDAP protocol about potential problems and required administrative tasks.

With reference now to the figures and in particular with reference to FIGS. 1-2, example diagrams of data processing environments are provided in which illustrative embodiments of the present invention may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an example data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

The illustrative embodiments provide a mechanism for a lightweight directory access protocol (LDAP) administrator task notification control that provides administrators with notification via the LDAP protocol about potential problems and required administrative tasks. When an administrative account binds or otherwise connects to a directory server to perform an operation on a director server, an administrative maintenance control is sent with the operation. The directory server identifies the administrative maintenance control and responds to the administrator with maintenance information about the directory server. The illustrative embodiments provide for sending the maintenance information to the administrator only if the received operation includes the administrative maintenance control. The response contains maintenance information which may be used by end user applications such as a Web admin tool, application programming interface (API), or the like, to provide pop up messages to the administrator and subsequently guide the administrator through tasks to address the maintenance issue.

Figure 3:
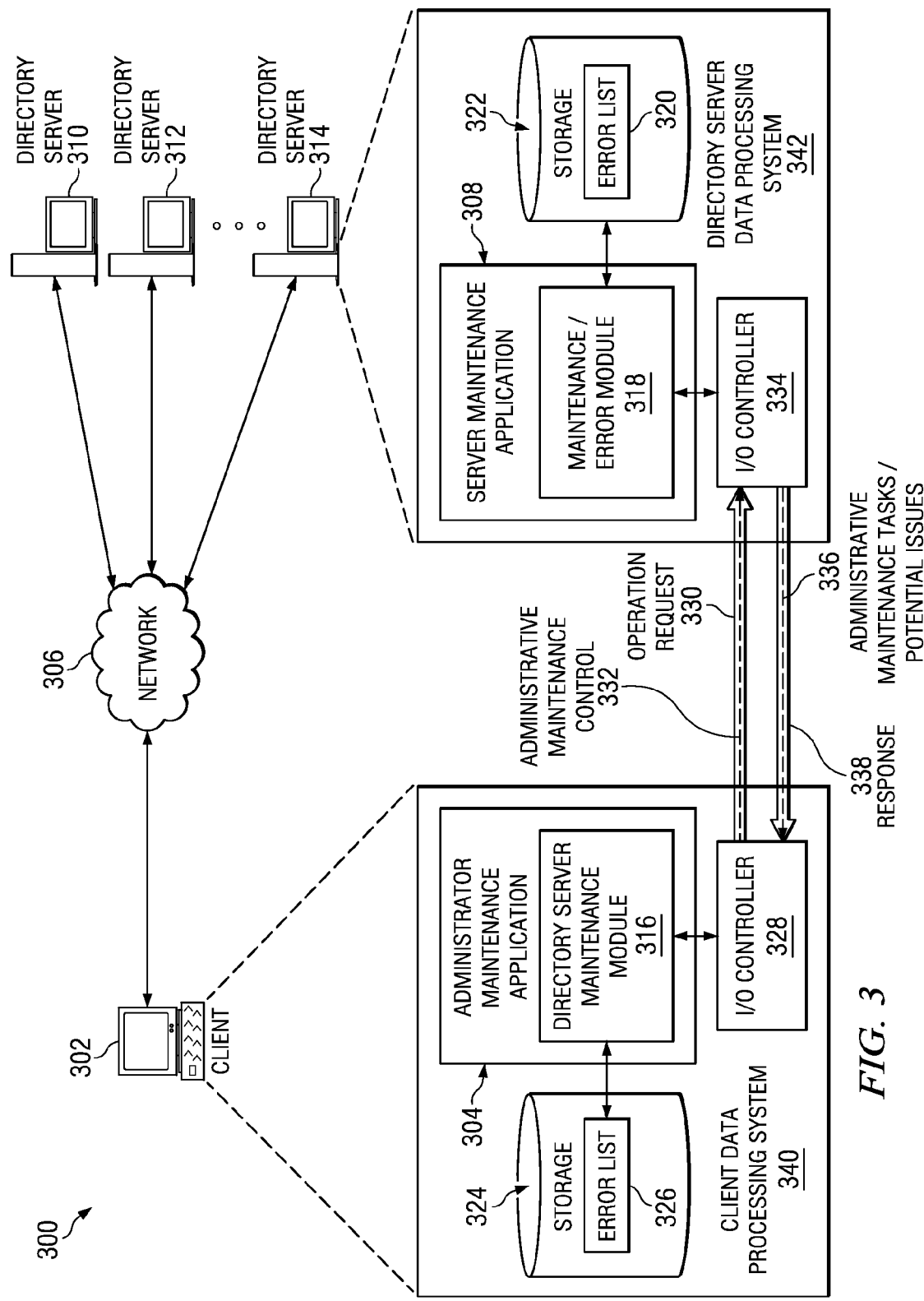
FIG. 3 depicts an example of a functional block diagram for a lightweight directory access protocol (LDAP) administrator task notification mechanism in accordance with an illustrative embodiment.

FIG. 3 depicts an example of a functional block diagram for a lightweight directory access protocol (LDAP) administrator task notification mechanism in accordance with an illustrative embodiment. In LDAP task notification mechanism 300, client 302 comprises client data processing system 340 that executes administrator maintenance application 304 which communicates through I/O controller 328, network 306, and I/O controller 334 to server maintenance application 308 running on directory server data processing system 342 of each of directory servers 310, 312, and 314. Using administrator maintenance application 304, an administrator may set up a profile in directory server maintenance module 316 that will establish administrative maintenance controls. By setting up the profile in directory server maintenance module 316, when an administrative account of the administrator binds or otherwise connects to one or more of directory servers 310, 312, and 314 in order to perform an operation on, for example, directory server 314, directory server maintenance module 316 automatically and proactively and without direct intervention by the administrator sends via I/O controller 328 in the overhead of operation request 330 administrative maintenance control 332 to I/O controller 334 in directory server 314. By sending administrative maintenance control 332 in this manner, administrative maintenance tasks and/or potential issues 336 recorded by maintenance/error module 318 may be retrieved from directory server 314 without the administrator being required to directly retrieve administrative maintenance tasks and/or potential issues 336.

The following is an example of operation request 330 that may be sent to directory server 314:

```
request - command line-
    ldapsearch -D cn=AdminCN -w adminPW -b o=ibm,c=us
"seeAlso=John Doe"
```

In the overhead of operation request 330, directory server maintenance module 316 also sends administrative maintenance control 332. The following is an example of a standard protocol for an LDAP control that may be sent to directory server 314:

```
Controls ::= SEQUENCE OF Control
    Control ::= SEQUENCE {
        controlType      LDAPOID,
        criticality      BOOLEAN DEFAULT FALSE,
        controlValue     OCTET STRING OPTIONAL }
```

Administrative maintenance control 332 may follow this format with an assigned object identifier (OID). The OID is assigned to a specific value during product development. The criticality is generally false and octet string may not be needed on the request.

Maintenance/error module 318 monitors incoming operation request 330 to directory server 314 to detect administrative maintenance control 332 that may be associated with operation request 330. If operation request 330 includes administrative maintenance control 332, maintenance/error module 318 automatically and proactively, without direct intervention by the administrator, retrieves error list 320 from storage 322 that includes administrative maintenance tasks and/or potential issues 336 that have been recorded for the particular one of directory server 310, 312, or 314. Then maintenance/error module 318 returns administrative maintenance tasks and/or potential issues 336 from error list 320 to administrator maintenance application 304 with response 338 to the operation requested by the administrator. The following is an example of administrative maintenance tasks and/or potential issues 336 that may be returned to administrative maintenance application 304:

```
{maintenance:required:1:suggested:2,
 required:"update db2 password",
 optional:"run perftune to improve performance":"define index
 on seeAlso"}
```

Directory server maintenance module 316 retrieves administrative maintenance tasks and/or potential issues 336 from response 338 and stores administrative maintenance tasks and/or potential issues 336 in storage 324 as error list 326. Directory server maintenance module 316 also notifies an end user applications such as a Web admin tool, application programming interface (API), or the like, on client 302 so that an end user application may provide a notification to the administrator of administrative maintenance tasks and/or potential issues 336. The end user application may notify the administrator of the administrative maintenance tasks and/or potential issues by displaying the administrative maintenance tasks and/or potential issues to the administrator through a graphical user interface. The end user application may then guide the administrator through addressing each of administrative maintenance tasks and/or potential issues 336. As the administrator addresses each of administrative maintenance tasks and/or potential issues 336, the end user application may then update error list 326 on client 302.

While the illustrative embodiments provide a means for automatically and proactively retrieving administrative maintenance tasks and/or potential issues 336 without the administrator directly requesting the error log files of directory servers 310, 312, and 314, that administrator is still able to explicitly retrieve administrative maintenance tasks and potential issues 336 from directory server 310, 312, or 314 via an extended operation or an explicit cn=maintenance search request.

The following is an example of an explicit extended operation that may be sent to directory server 310, 312, or 314:

ldapexop-D cn=AdminCN-w adminPW-op maintenance

The following is an example of the standard extended operation request:

```
ExtendedRequest ::= [APPLICATION 23] SEQUENCE {
    requestName   [0] LDAPOID,
    requestValue  [1] OCTET STRING OPTIONAL }
```

The explicit extended operation may follow this format with an assigned OID. The OID is assigned to a specific value during product development. For this request there may be no need for the optional octet string, so the LDAPOID may be all that is needed.

The following is an example of the standard extended operation response

```
ExtendedResponse ::= [APPLICATION 24] SEQUENCE {
    COMPONENTS OF LDAPResult,
    responseName  [10] LDAPOID OPTIONAL,
    response      [11] OCTET STRING OPTIONAL }
```

The explicit extended operation response may follow this format with an assigned OID. The OID is assigned to a specific value during product development. If administrative maintenance tasks and/or potential issues 336 were provided in an octect string, the octet may look like the following:

```
{maintenance:required:1:suggested:2,
required:"update db2 password",
optional:"run perftune to improve performance":"define index on seeAlso"}
```

As described previously, the administrator may also explicitly retrieve administrative maintenance tasks and potential issues 336 from directory server 310, 312, or 314 via an explicit cn=maintenance search request. The following is an example of an explicit cn=maintenance search request that may be sent to directory server 310, 312, or 314:

ldapsearch-D cn=AdminCN-w adminPW-b cn=maintenance objectclass=*

An example of administrative maintenance tasks and/or potential issues 336 of an explicit cn=maintenance search request may be:

```
cn=maintenance
    required: 1
    suggested: 2
cn=required,cn=maintenance
    action: update db2 password
cn=suggested,cn=maintenance
    action: run perftune to improve performance
    action: define index on seeAlso
```

Thus, the illustrative embodiment provides for a lightweight directory access protocol (LDAP) administrator task notification control that provides administrators with notification via the LDAP protocol about potential problems and required administrative tasks. When an administrative account binds or otherwise connects to a directory server to perform an operation on a director server, an administrative maintenance control is sent with the operation. The directory server identifies the administrative maintenance control and responds to the administrator with maintenance information about the directory server.

Figure 4:
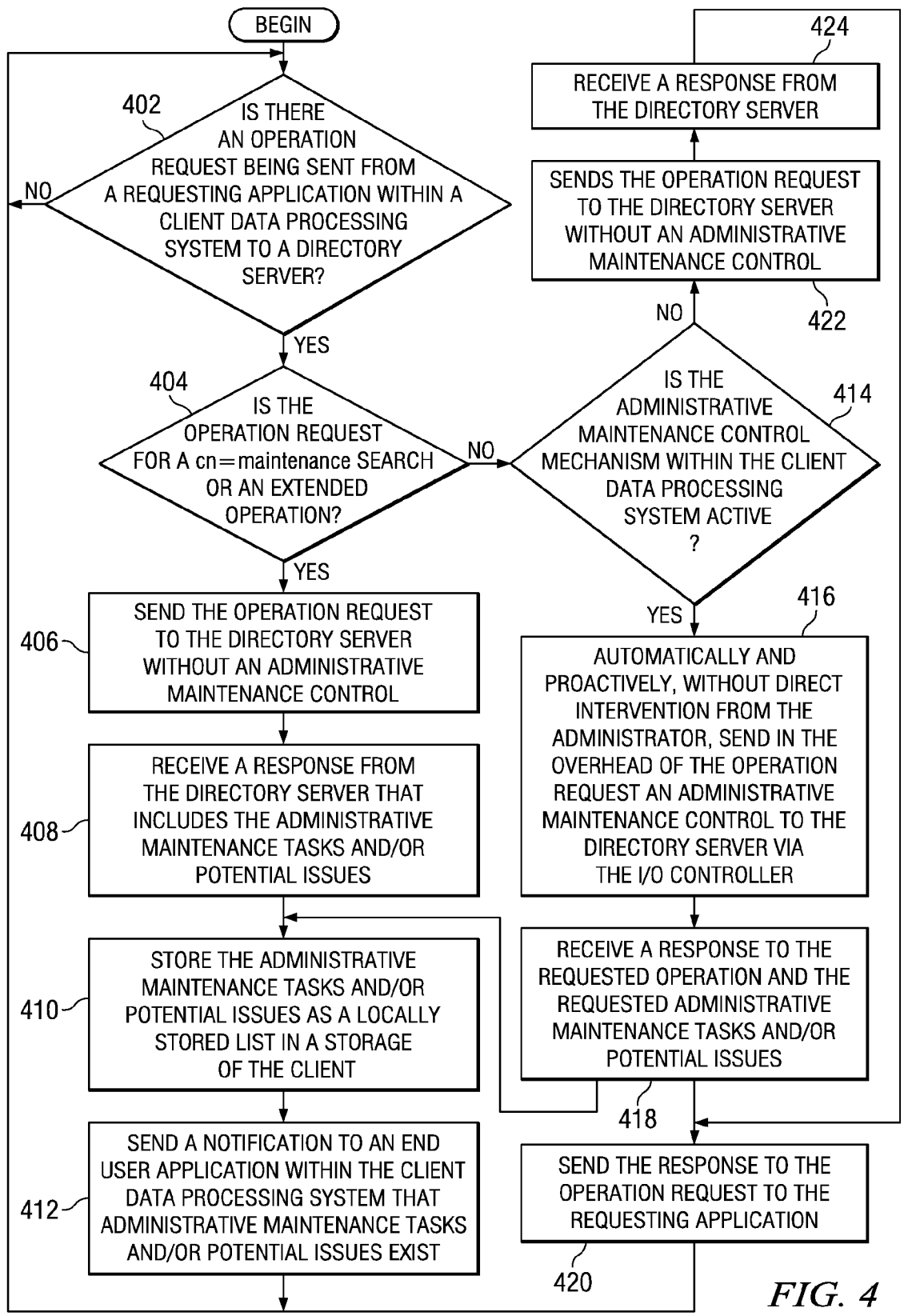
FIG. 4 depicts an example of the operation performed by a directory server maintenance module of a lightweight directory access protocol (LDAP) administrator task notification mechanism in accordance with an illustrative embodiment.

FIG. 4 depicts an example of the operation performed by a directory server maintenance module of a lightweight directory access protocol (LDAP) administrator task notification mechanism in accordance with an illustrative embodiment. As the operation begins, a directory server maintenance module determines if there is an operation request being sent from an application within a client data processing system to a directory server (step 402). If at step 402 there is no operation request being sent to the directory server, the operation returns to step 402. If at step 402 there is an operation request being sent to the directory server, the directory server maintenance module determines if the operation request is for an explicit cn=maintenance search or an explicit extended operation (step 404). If at step 404 the operation request is for either an explicit cn=maintenance search or an explicit extended operation, an I/O controller within the client data processing system sends the operation request to the directory server without an administrative maintenance control (step 406). The operating system of the client data processing system then waits to receive a response from the directory server that includes the administrative maintenance tasks and/or potential issues (step 408). Once the requested administrative maintenance tasks and/or potential issues are received, then the directory server maintenance module stores the administrative maintenance tasks and/or potential issues in a storage of the client (step 410) and sends a notification to an end user application within the client data processing system that administrative maintenance tasks and/or potential issues exist (step 412), with the operation returning to step 402 thereafter.

If at step 404 the operation request is not for an explicit cn=maintenance search or an explicit extended operation, then the directory server maintenance module determines if the administrative maintenance control mechanism within the client data processing system is active (step 414). If at step 414 the administrative maintenance control mechanism is active, then the directory server maintenance module automatically and proactively, without direct intervention from the administrator, sends in the overhead of the operation request an administrative maintenance control to the directory server via the I/O controller (step 416). The operating system of the client data processing system then waits to receive a response to the requested operation and the requested administrative maintenance tasks and/or potential issues (step 418). Once a response to the requested operation and the requested administrative maintenance tasks and/or potential issues are received, the operating system sends the response to the operation request to the requesting application (step 420), with the operation returning to step 402 thereafter. In addition, the directory server maintenance module stores the administrative maintenance tasks and/or potential issues as a locally stored list of administrative maintenance tasks and/or potential issues in a storage of the client (step 410) and sends a notification to an end user application within the client data processing system that administrative maintenance tasks and/or potential issues exist (step 412), with the operation returning to step 402 thereafter.

If at step 414 the administrative maintenance control mechanism is not active, then the I/O controller within the client data processing system sends the operation request to the directory server without an administrative maintenance control (step 422). The operating system of the client data processing system then waits to receive a response from the directory server (step 424). Once the response is received, then the operating system sends the response to the I/O operation to the requesting application (step 420), with the operation returning to step 402 thereafter.

Figure 5:
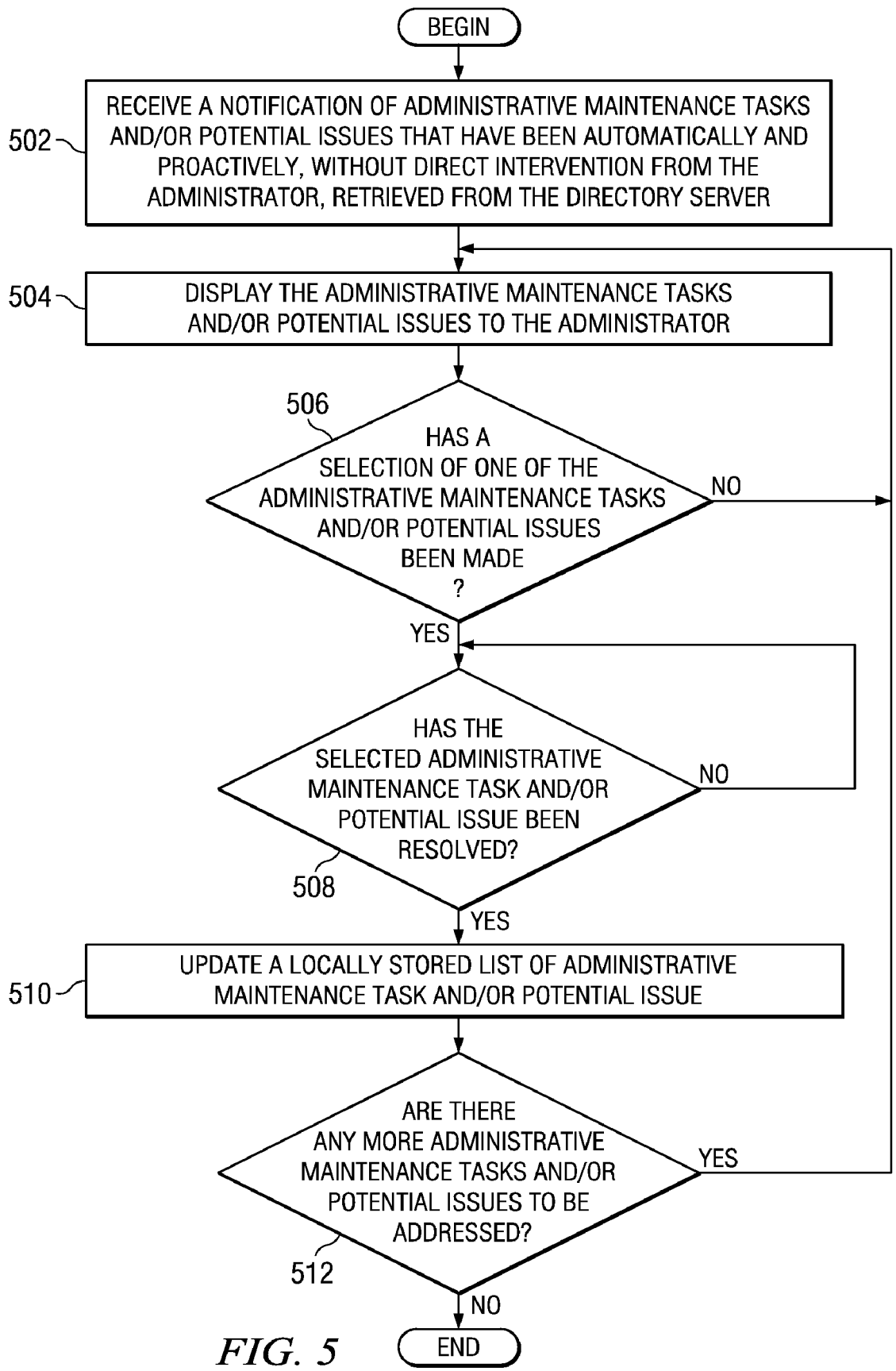
FIG. 5 depicts an example of the operation performed by an end user application of a lightweight directory access protocol (LDAP) administrator task notification mechanism in accordance with an illustrative embodiment.

FIG. 5 depicts an example of the operation performed by an end user application of a lightweight directory access protocol (LDAP) administrator task notification mechanism in accordance with an illustrative embodiment. As the operation begins, an end user application within the client data processing system receives a notification of administrative maintenance tasks and/or potential issues that have been automatically and proactively, without direct intervention from the administrator, retrieved from the directory server (step 502). The end user application displays the administrative maintenance tasks and/or potential issues to the administrator so that the administrator may address the administrative maintenance tasks and/or potential issues (step 504). The end user application then determines if a selection of one of the administrative maintenance tasks and/or potential issues has been made (step 506). If at step 506 there is no selection of the administrative maintenance tasks and/or potential issues, the operation returns to step 504.

If at step 506 there is a selection of one of the administrative maintenance tasks and/or potential issues, then the end user application determines if the selected administrative maintenance task and/or potential issue has been resolved by the administrator (step 508). If at step 508 the selected administrative maintenance task and/or potential issue has not been resolved, the operation returns to step 508. If at step 508 the selected administrative maintenance task and/or potential issue has been resolved, then the end user application updates a locally stored list of the administrative maintenance task and/or potential issue (step 510). Then the end user application determines if there are any more administrative maintenance tasks and/or potential issues to be addressed (step 512). If at step 512 there are more administrative maintenance tasks and/or potential issues, the operation returns to step 504. If at step 512 there are no more administrative maintenance tasks and/or potential issues, the operation terminates.

Figure 6:
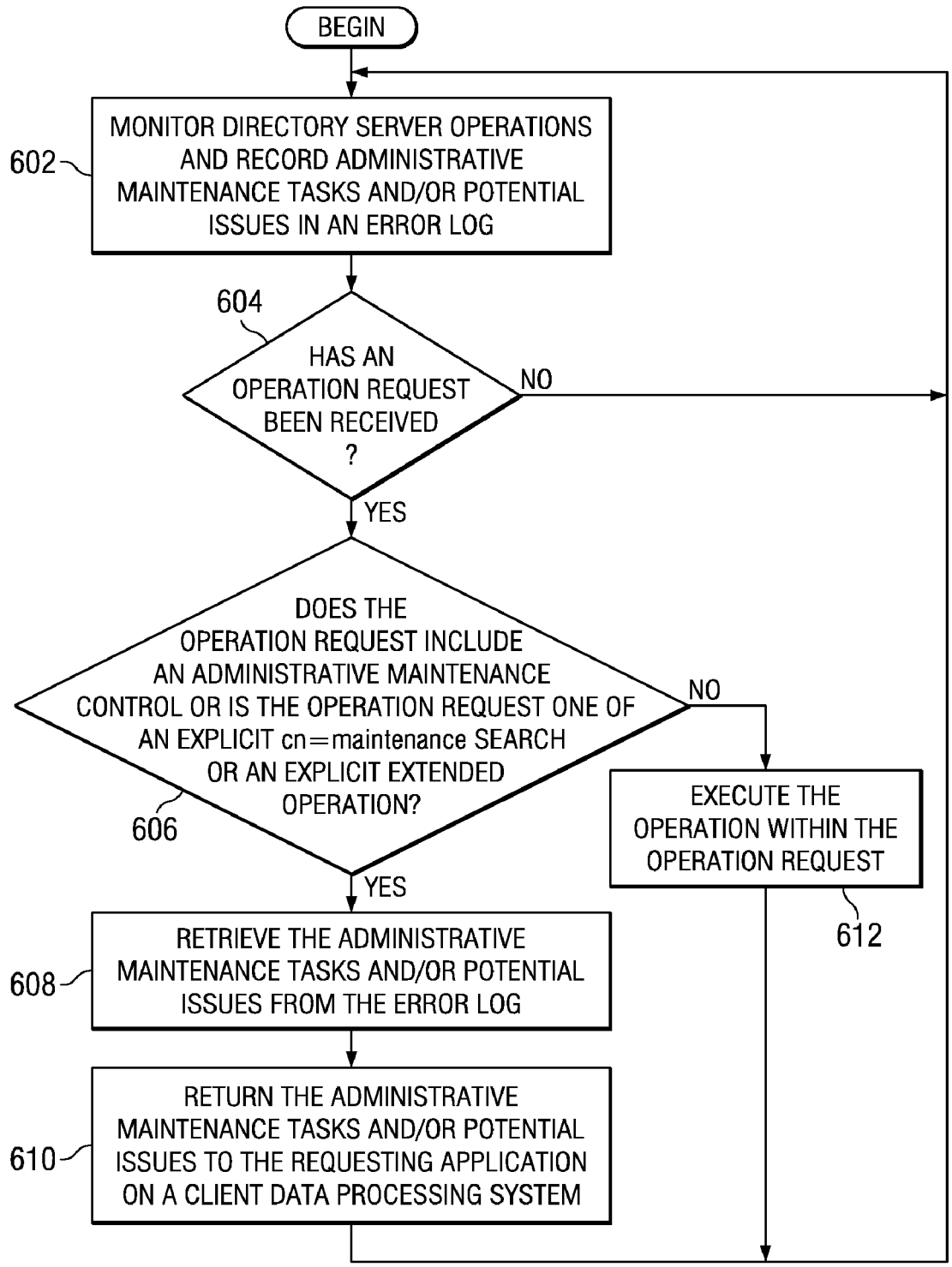
FIG. 6 depicts an example of the operation performed by maintenance/error module within a directory server of a lightweight directory access protocol (LDAP) administrator task notification mechanism in accordance with an illustrative embodiment.

FIG. 6 depicts an example of the operation performed by maintenance/error module within a directory server of a lightweight directory access protocol (LDAP) administrator task notification mechanism in accordance with an illustrative embodiment. As the operation begins, the maintenance/error module within the directory server monitors directory server operations and records administrative maintenance tasks and/or potential issues in an error log (step 602). The maintenance/error module also monitors for incoming operation requests (step 604). If at step 604 no incoming operation request has been received, the operation returns to step 602. If at step 604 an incoming operation request is received, the maintenance/error module determines if the operation request includes an administrative maintenance control or is one of an explicit cn=maintenance search or an explicit extended operation (step 606).

If at step 606 the operation request includes an administrative maintenance control or is one of an explicit cn=maintenance search or an explicit extended operation, then the maintenance/error module retrieves the administrative maintenance tasks and/or potential issues from the error log (step 608) and returns the administrative maintenance tasks and/or potential issues to the requesting application on a client data processing system (step 610), with the operation returning to step 602 thereafter. If at step 606 the operation request does not includes an administrative maintenance control or is not one of an explicit cn=maintenance search or an explicit extended operation, then the operating system of the directory server executes the operation within the operation request (step 612), with the operation returning to step 602 thereafter.

Thus, the illustrative embodiments provide mechanisms for a lightweight directory access protocol (LDAP) administrator task notification control mechanism that provides administrators with notification via the LDAP protocol about potential problems and required administrative tasks. When an administrative account binds or otherwise connects to a directory server to perform an operation on a director server, an administrative maintenance control is sent with the operation. The directory server identifies the administrative maintenance control and responds to the administrator with maintenance information about the directory server. The illustrative embodiments provide for sending the maintenance information to the administrator only if the received operation includes the administrative maintenance control. The response contains maintenance information which may be used by end user applications such as a Web admin tool, application programming interface (API), or the like, to provide pop up messages to the administrator and subsequently guide the administrator through tasks to address the maintenance issue.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a client data processing system, for automatically and proactively retrieving administrative maintenance tasks or potential issues from a set of directory servers without direct intervention from an administrator, the method comprising:
   responsive to an operation request being sent from a requesting application on the client data processing system to the set of directory servers and an administrative maintenance control mechanism in the client data processing system being active, determining, by the administrative maintenance control mechanism, whether the operation request being sent from the requesting application to the set of directory servers is for an explicit cn=maintenance search or an explicit extended operation;
   responsive to the operation request failing to be for either the explicit cn=maintenance search or the explicit extended operation, automatically sending, by the administrative maintenance control mechanism, an administrative maintenance control along with the operation request to the set of directory servers without direct intervention from the administrator;
   receiving, by the administrative maintenance control mechanism, a response from the set of directory servers, wherein the response includes a response to the operation request and a response to the administrative maintenance control and wherein the response to the administrative maintenance control comprises at least one of the administrative maintenance tasks or the potential issues;
   responsive to receiving the response to the administrative maintenance control, automatically notifying, by the administrative maintenance control mechanism, an end user application within the client data processing system that the at least one of the administrative maintenance tasks or the potential issues have been received;
   responsive to the operation request being either the explicit cn=maintenance search or the explicit extended operation, skipping, by the administrative maintenance control mechanism, the step of determining whether the administrative maintenance control mechanism is active;
   sending, by the administrative maintenance control mechanism, the operation request to the set of directory servers without the administrative maintenance control;
   receiving, by the administrative maintenance control mechanism, a response to the explicit cn=maintenance search or the explicit extended operation from the set of directory servers, wherein the response to the explicit cn=maintenance search or the explicit extended operation comprises the at least one of the administrative maintenance tasks or the potential issues; and
   responsive to receiving the response to the explicit cn=maintenance search or the explicit extended operation, automatically notifying, by the administrative maintenance control mechanism, an end user application within the client data processing system that the at least one of the administrative maintenance tasks or the potential issues have been received.

2. The method of claim 1, wherein the administrative maintenance control is sent in the overhead of the operation request.

3. The method of claim 1, further comprising:
   responsive to receiving the response to the operation request, sending, by the administrative maintenance control mechanism, the response to the operation request to the requesting application.

4. The method of claim 1, further comprising:
   responsive to the operation request being sent from the requesting application to the set of directory servers and the administrative maintenance control mechanism being inactive, sending, by the administrative maintenance control mechanism, the operation request to the set of directory servers without the administrative maintenance control;
   receiving, by the administrative maintenance control mechanism, the response to the operation request from the set of directory servers; and
   responsive to receiving the response to the operation request, sending, by the administrative maintenance control mechanism, the response to the operation request to the requesting application.

5. The method of claim 1, further comprising:
   storing, by the administrative maintenance control mechanism, the at least one of the administrative maintenance tasks or the potential issues as a locally stored list of administrative maintenance tasks or potential issues in a local storage on the client data processing system;
   displaying, by the administrative maintenance control mechanism, the at least one of the administrative maintenance tasks or the potential issues to the user in a graphical user interface;
   determining, by the administrative maintenance control mechanism, whether the administrator has addressed one or more of the at least one of the administrative maintenance tasks or the potential issues;
   responsive to the administrator addressing one or more of the at least one of the administrative maintenance tasks or the potential issues, updating, by the administrative maintenance control mechanism, the locally stored list of administrative maintenance tasks or potential issues.

6. The method of claim 1, wherein the end user application is at least one of a Web admin tool or an application programming interface (API).

7. The method of claim 1, wherein the administrative maintenance control is a lightweight directory access protocol (LDAP) control.

8. A computer program product comprising a computer recordable medium having a computer readable program recorded thereon, wherein the computer readable program, when executed on a computing device, causes the computing device to:
   responsive to an operation request being sent from a requesting application on the computing device to the set of directory servers and an administrative maintenance control mechanism on the computing device being active, determine, by the administrative maintenance control mechanism, whether the operation request being sent from the requesting application to the set of directory servers is for an explicit cn=maintenance search or an explicit extended operation;
   responsive to the operation request failing to be for either the explicit cn=maintenance search or the explicit extended operation, automatically send, by the administrative maintenance control mechanism, an administrative maintenance control along with the operation request to the set of directory servers without direct intervention from an administrator;

receive, by the administrative maintenance control mechanism, a response from the set of directory servers, wherein the response includes a response to the operation request and a response to the administrative maintenance control and wherein the response to the administrative maintenance control comprises at least one of the administrative maintenance tasks or the potential issues;

responsive to receiving the response to the administrative maintenance control, automatically notify, by the administrative maintenance control mechanism, an end user application within the computing device that the at least one of the administrative maintenance tasks or the potential issues have been received;

responsive to the operation request being either the explicit cn=maintenance search or the explicit extended operation, skip, by the administrative maintenance control mechanism, the step of determining whether the administrative maintenance control mechanism is active;

send, by the administrative maintenance control mechanism, the operation request to the set of directory servers without the administrative maintenance control;

receive, by the administrative maintenance control mechanism, a response to the explicit cn=maintenance search or the explicit extended operation from the set of directory servers, wherein the response to the explicit cn=maintenance search or the explicit extended operation comprises the at least one of the administrative maintenance tasks or the potential issues; and responsive to receiving the response to the explicit cn=maintenance search or the explicit extended operation, automatically notify, by the administrative maintenance control mechanism, the end user application within the computing device that the at least one of the administrative maintenance tasks or the potential issues have been received.

9. The computer program product of claim 8, wherein the administrative maintenance control is sent in the overhead of the operation request.

10. The computer program product of claim 8, wherein the computer readable program further causes the computing device to:

responsive to receiving the response to the operation request, send, by the administrative maintenance control mechanism, the response to the operation request to the requesting application.

11. The computer program product of claim 8, wherein the computer readable program further causes the computing device to:

responsive to the operation request being sent from the requesting application to the set of directory servers and the administrative maintenance control mechanism being inactive, send, by the administrative maintenance control mechanism, the operation request to the set of directory servers without the administrative maintenance control;

receive, by the administrative maintenance control mechanism, the response to the operation request from the set of directory servers; and responsive to receiving the response to the operation request, send, by the administrative maintenance control mechanism, the response to the operation request to the requesting application.

12. The computer program product of claim 8, wherein the computer readable program further causes the computing device to:

store, by the administrative maintenance control mechanism, the at least one of the administrative maintenance tasks or the potential issues as a locally stored list of administrative maintenance tasks or potential issues in a local storage on the data processing system;

display, by the administrative maintenance control mechanism, the at least one of the administrative maintenance tasks or the potential issues to the user in a graphical user interface;

determine, by the administrative maintenance control mechanism, whether the administrator has addressed one or more of the at least one of the administrative maintenance tasks or the potential issues; and responsive to the administrator addressing one or more of the at least one of the administrative maintenance tasks or the potential issues, update, by the administrative maintenance control mechanism, the locally stored list of administrative maintenance tasks or potential issues.

13. An apparatus, comprising:

a processor; and a memory coupled to the processor, wherein the memory comprises instructions which, when executed by the processor, cause the processor to:

responsive to an operation request being sent from a requesting application on the apparatus to the set of directory servers and an administrative maintenance control mechanism in the apparatus being active, determine, by the administrative maintenance control mechanism, whether the operation request being sent from the requesting application to the set of directory servers is for an explicit cn=maintenance search or an explicit extended operation;

responsive to the operation request failing to be for either the explicit cn=maintenance search or the explicit extended operation, automatically send, by the administrative maintenance control mechanism, an administrative maintenance control along with the operation request to the set of directory servers without direct intervention from an administrator;

receive, by the administrative maintenance control mechanism, a response from the set of directory servers, wherein the response includes a response to the operation request and a response to the administrative maintenance control and wherein the response to the administrative maintenance control comprises at least one of the administrative maintenance tasks or the potential issues;

responsive to receiving the response to the administrative maintenance control, automatically notify, by the administrative maintenance control mechanism, an end user application within the apparatus that the at least one of the administrative maintenance tasks or the potential issues have been received;

responsive to the operation request being either the explicit cn=maintenance search or the explicit extended operation, skip, by the administrative maintenance control mechanism, the step of determining whether the administrative maintenance control mechanism is active;

send, by the administrative maintenance control mechanism, the operation request to the set of directory servers without the administrative maintenance control;

receive, by the administrative maintenance control mechanism, a response to the explicit cn=maintenance search or the explicit extended operation from the set of directory servers, wherein the response to the explicit cn=maintenance search or the explicit extended operation comprises the at least one of the administrative maintenance tasks or the potential issues; and responsive to receiving the response to the explicit cn=maintenance search or the explicit extended operation, automatically notify, by the administrative maintenance control mechanism, the end user application within the apparatus that the at least one of the administrative maintenance tasks or the potential issues have been received.

14. The apparatus of claim 13, wherein the administrative maintenance control is sent in the overhead of the operation request.

15. The apparatus of claim 13, wherein the instructions further cause the processor to:

responsive to receiving the response to the operation request, send, by the administrative maintenance control mechanism, the response to the operation request to the requesting application.

16. The apparatus of claim 13, wherein the instructions further cause the processor to:

responsive to the operation request being sent from the requesting application to the set of directory servers and the administrative maintenance control mechanism being inactive, send, by the administrative maintenance control mechanism, the operation request to the set of directory servers without the administrative maintenance control;

receive, by the administrative maintenance control mechanism, the response to the operation request from the set of directory servers; and responsive to receiving the response to the operation request, send, by the administrative maintenance control mechanism, the response to the operation request to the requesting application.

17. The apparatus of claim 13, wherein the instructions further cause the processor to:

store, by the administrative maintenance control mechanism, the at least one of the administrative maintenance tasks or the potential issues as a locally stored list of administrative maintenance tasks or potential issues in a local storage on the data processing system;

display, by the administrative maintenance control mechanism, the at least one of the administrative maintenance tasks or the potential issues to the user in a graphical user interface;

determine, by the administrative maintenance control mechanism, whether the administrator has addressed one or more of the at least one of the administrative maintenance tasks or the potential issues; and responsive to the administrator addressing one or more of the at least one of the administrative maintenance tasks or the potential issues, update, by the administrative maintenance control mechanism, the locally stored list of administrative maintenance tasks or potential issues.

* * * * *